United States Patent
Nakamura et al.

4,176,913
Dec. 4, 1979

[54] TELEPHOTO LENS WITH LARGE RELATIVE APERTURE

[75] Inventors: Soichi Nakamura, Kamakura; Kiyoshi Hayashi, Koganei, both of Japan

[73] Assignee: Nippon Kogaku K.K., Tokyo, Japan

[21] Appl. No.: 900,794

[22] Filed: Apr. 27, 1978

[30] Foreign Application Priority Data

Apr. 28, 1977 [JP] Japan .................. 52-48477

[51] Int. Cl.² .............. G02B 9/62; G02B 9/64
[52] U.S. Cl. .................. 350/214; 350/177; 350/215
[58] Field of Search ............ 350/214, 212, 177, 215

[56] References Cited
U.S. PATENT DOCUMENTS

| | | | |
|---|---|---|---|
| 4,113,357 | 9/1978 | Nakamura | 350/214 X |
| 4,126,378 | 11/1978 | Ogino | 350/214 |

*Primary Examiner*—Paul A. Sacher
*Attorney, Agent, or Firm*—Shapiro and Shapiro

[57] ABSTRACT

A telephoto lens with large relative aperture comprises a first converging lens group, a diverging lens group and a second converging lens group arranged in this order as viewed from the object side. The first converging lens group has two positive lens components and a negative lens component spaced from each other by an air space, the group remaining fixed when focusing. The diverging lens group has a cemented negative lens component and a negative lens component with an air space therebetween which is larger than the sum of the center thickness of the former component and the center thickness of the latter component. The second converging lens group comprises a cemented lens component and remains fixed when focusing. The first converging lens group and the diverging lens group virtually form an afocal system for an object at infinity. The diverging lens group is movable along the optical axis toward the image side for focusing upon an object at a shorter distance and also toward the object side for focusing upon an object at a longer distance.

11 Claims, 12 Drawing Figures

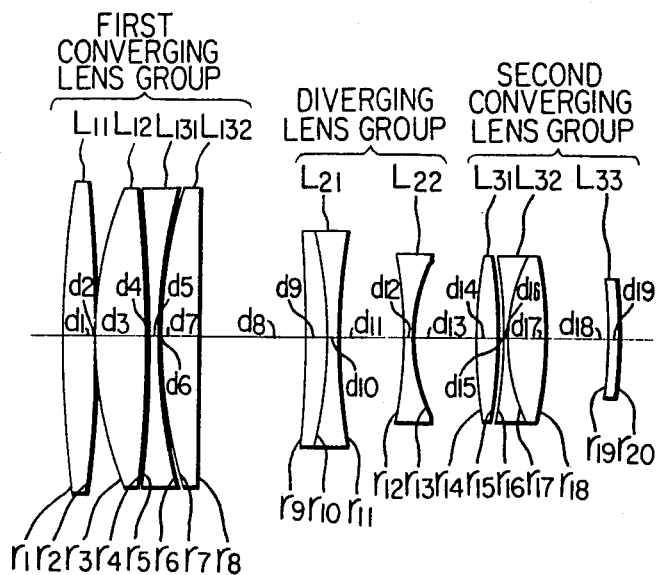
FIG. 3
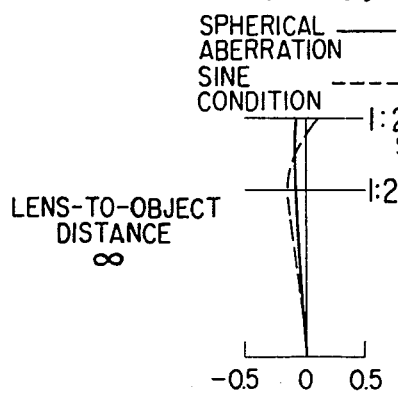
FIG. 4A
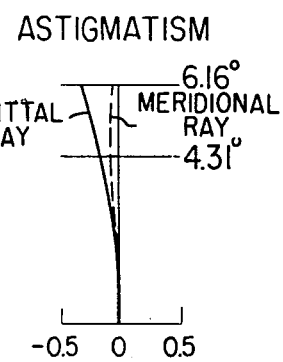
FIG. 4B
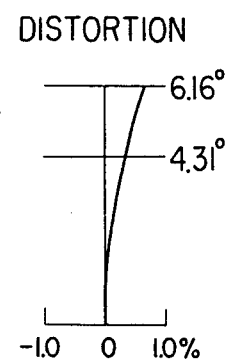
FIG. 4C
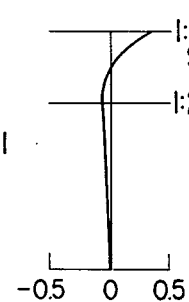
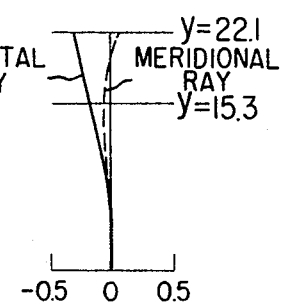
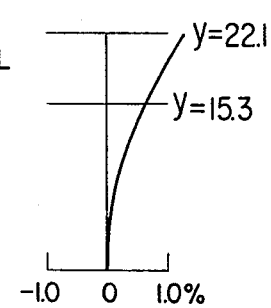

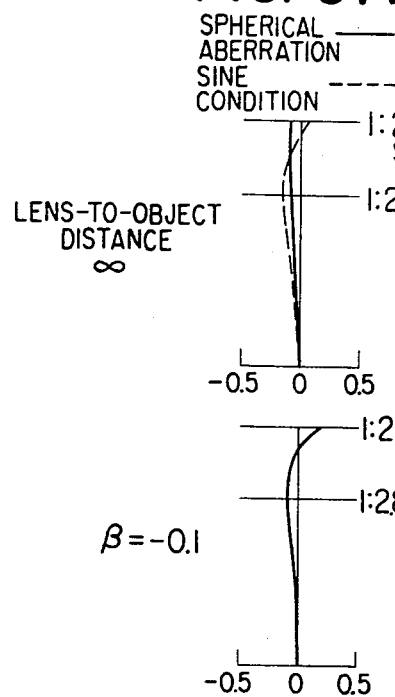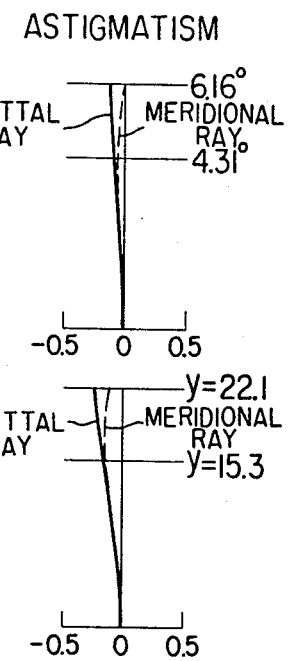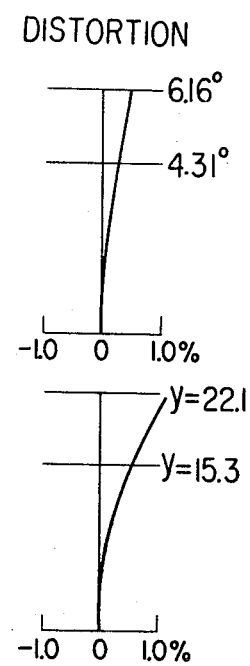
FIG. 5A  FIG. 5B  FIG. 5C
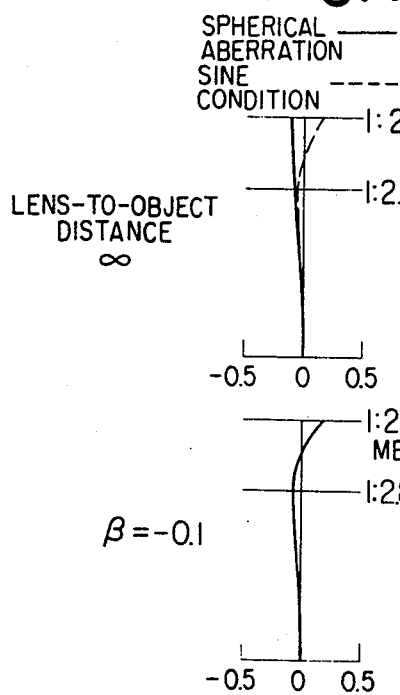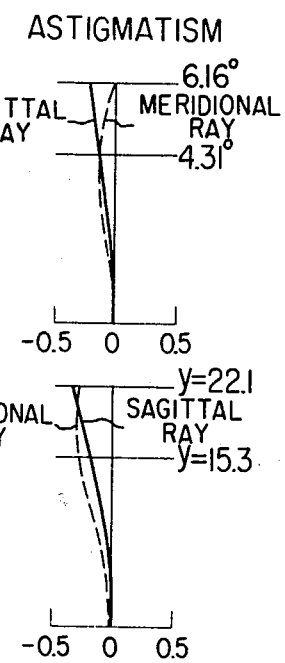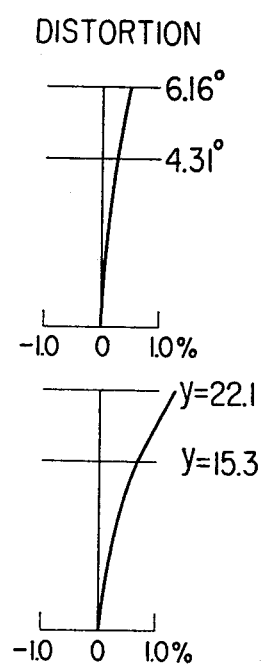
FIG. 6A  FIG. 6B  FIG. 6C

TELEPHOTO LENS WITH LARGE RELATIVE APERTURE

BACKGROUND OF THE INVENTION

1. Field of the Invention

The present invention relates to a telephoto lens with a large relative aperture.

2. Description of the Prior Art

Nowadays there is an increasing demand for large relative aperture telephoto lenses for use in still cameras, particularly for 35 mm still cameras by reducing the size and weight of such lenses to thereby improve their portability and to expand the field of photography. Also, there is a need that a telephoto lens possess the capability of focusing upon an object at a comparatively short distance.

A system hitherto commonly used in altering the focusing position of an ordinary lens from an object at infinity to an object at a short distance is called "total drawing-out system" according to which the entire lens is shifted toward the object side. However, this system is useful only with ordinary lenses, and is not applicable to those telephoto lenses of large relative aperture, for example a focal length of 200 mm or more and an F number of approximately 2.0. Attempts to apply the aforementioned system to a large relative aperture telephoto lens gives rise to the following problems:

(a) in the position set for short distance photography, the various aberrations become unmanageable, and therefore, the minimum distance allowable necessarily becomes a considerably large value;

(b) the whole configuration of the lens becomes large and therefore the total drawing-out mechanism itself becomes large and complicated to the extent that a smooth focusing operation cannot be obtained; and (c) since the diameter of the diaphragm becomes large, it is difficult to employ a so-called automatic diaphragm mechanism in which the motion of diaphragm blade is linked to the release of the shutter.

SUMMARY OF THE INVENTION

Accordingly, it is a general object of the invention to provide a large relative aperture telephoto lens which can be brought to a position for short distance photography, the various aberrations of the lens nevertheless being well corrected, and wherein the lens has the groups thereof arranged to allow a focusing mechanism that is simple in structure and easy to operate.

A still more specific object of the invention is to provide a large relative aperture telephoto lens which is useful for 35 mm still cameras while providing a focal length of 200 mm with an F number of 2.0.

To attain these and other objects, the lens group of the telephoto lens of the invention are arranged in a novel manner. The novel arrangement of lens groups is within the context of the known internal focusing type of telephoto lens which comprises three lens groups of positive-negative-positive. More particularly, the internal focusing type of telephoto lens comprises a first converging lens group, a diverging lens group and a second converging lens group arranged in this order as viewed from the object side. The first converging lens group comprises two positive lens components and a negative lens component with an air space therebetween, and remaining fixed when focusing. The diverging lens group comprises a cemented negative component and a negative lens component with an air space therebetween larger than the sum of the center thicknesses of these components. The second converging lens group comprises a cemented positive lens component, and remains fixed when focusing. For an object at infinity the first converging lens group and the diverging group together form a substantially afocal system, and the diverging lens group being movable along the optical axis toward the image side for focusing on an object at a short distance and toward the object side for focusing on an object at a longer distance.

Other features and advantages of the invention will become apparent from the following description taken in connection with the accompanying drawings.

BRIEF DESCRIPTION OF THE DRAWINGS

FIGS. 1, 2 and 3 show lens arrangements according to first, second and third embodiments of the invention; and FIGS. 4A, 4B and 4C through FIGS. 6A, 6B and 6C illustrate various aberration charts for the first, second and third embodiments, respectively.

DETAILED DESCRIPTION OF THE PREFERRED EMBODIMENTS

Figure 1:
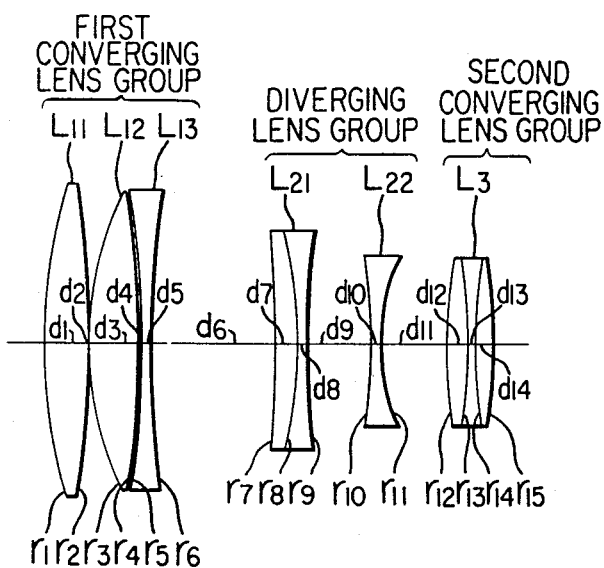

The first and second converging lens groups and the intermediate diverging lens group have the following relationship of focal lengths:

$$f = f_1 \cdot \left( \frac{f_3}{-f_2} \right) \quad (1)$$

wherein $f_1$, $f_2$ and $f_3$ are the focal lengths of the first converging group, the diverging group and the second converging group respectively, and f is the composite focal length of the total system.

It has been found that there exists an optimum condition of allotment of refractive power to attain the desired enlargement of relative aperture. The above described objects of the invention can best be attained when the following conditions are satisfied:

The refractive power (reciprocal of focal length) of the first converging lens group should be:

$$0.8 < \frac{f_1}{f} < 1.0; \text{ and} \quad (2)$$

for the diverging lens group:

$$0.3 < \frac{|f_2|}{f} < 0.6 \quad (3)$$

The range of power to be alloted to the second converging lens group is given directly by the above conditions (2) and (3) using the indicated fundamental relationship (1). Therefore, the power allotment to each of the lens groups in the telephoto lens according to the invention is determined by the conditions (2) and (3).

By satisfying the above conditions of power allotment among the lens groups, it becomes possible to provide a telephoto lens which has a large relative aperture, the lens also enabling the performance of short distance photography without the aberrations becoming unsatisfactory to an undesirable extent in this position. The aberration balance among the lens groups becomes most appropriate to maintain the aberration of the whole system at optimum conditions. At the same time, the number of lens components required for each of the groups is limited to the smallest possible value to enable making the size and shape of the total lens system small, and therefore, making the arrangement thereof very simple.

When a value less than the lowest limit of condition (2) is used, the refractive power of the first converging lens group becomes too strong so that the development of aberrations in this group becomes overcorrected. In particular, the development of higher order spherical aberration in this first group becomes corrected to the extent that the correction of the aberration by the lens components in the following groups is no longer possible. Moreover, the variation of aberration between infinity photography and short distance photography is very turbulent so that it becomes difficult to maintain a well corrected condition of aberration when the diaphragm is in its fully open position.

On the contrary, the refractive power of the first converging lens group becomes smaller with the increase of value of condition (2). Therefore, the distance moved by the diverging group for focusing on an object at a short distance is to be increased accordingly. Thus, when the value exceeds the upper limit of condition (2), the amount of shift of the diverging group will be beyond the maximum amount of total drawing-out designed for the common telephoto lens. This means that the significant aspect of the invention which enables an internal focusing system to be employed would be lost.

For the diverging lens group condition (3) is essential because the refractive power of the diverging group becomes stronger with the decrease in the value of this condition. Accordingly, the position at which the principal ray of an oblique beam crosses the most forward lens surface of the first converging group is substantially apart from the optical axis, and the distance between such position and the optical axis becomes far larger which in turn requires a larger aperture of the first converging lens group. Thus, when the value is smaller than the lowermost limit of condition (3), the aperture of the most forward lens required to sufficiently take in marginal rays will be beyond the maximum aperture determined by the F number. Therefore, it would become impossible to make a lens of suitable size. Moreover, in view of aberration, when the lowermost limit is exceeded, there occurs a substantial development of higher order aberration due to the unduly strong refractive power of the diverging group. Since the aberration is too high for correction by other groups, it is no longer possible to maintain the aberration in a well corrected state.

On the other hand, when the refractive power of the diverging group is weakened with the increase of the value of condition (3), the necessary aperture of the diverging group is enlarged in order to form, together with the first converging group, an approximate afocal system. Thus, if the upper limit of condition (3) is exceeded, then the aperture will become too large to maintain the merit of the internal focusing system used in the invention. Also, the diaphragm diameter and the total length of the lens become too large to employ an automatic diaphragam mechanism. In addition, the Petzval sum becomes large in the positive direction and thereby the curvature of image plane in the negative direction and astigmatism become excessive. Even if these may be corrected by other groups, it is very difficult to suppress the variation of image plane which occurs in the position for close-up photography.

The lens arrangement shown in FIG. 1 is a basic one designed to satisfy the above conditions of refractive power allotment among the three lens groups. In the arrangement shown in FIG. 1, the first converging lens group comprises two positive lens components $L_{11}$ and $L_{12}$ and one negative lens component $L_{13}$ in this order as viewed from the object side. The diverging lens group comprises a cemented negative lens component $L_{21}$ and a negative lens component $L_{22}$, and the second converging lens group comprises a cemented positive component $L_3$ composed of positive-negative-positive lenses.

In the telephoto lens of the invention, there is only a very small variation of aberration between infinity photography and close-up photography, although the lens is of large relative aperture. In particular, spherical aberration and astigmatism are well corrected.

According to a further aspect of the invention, it has been found that the optimum stability of aberrations as a whole can be assured when the first converging group is corrected independently of the other groups for spherical aberration, which is also corrected by the diverging group and the second converging group. For astigmatism, the first converging group is corrected only to an under-corrected state so that it may be essentially compensated for by the diverging group.

The optimization of aberrations as a whole described above is realized preferably by satisfying the following conditions:

$$1.0 < \frac{f_{11}}{f_1} < 3.3; \tag{4}$$

$$0.8 < \frac{|f_{22}|}{|f_2|} < 1.5; \text{ and} \tag{5}$$

$$0.15 < \frac{D}{|f_2|} < 0.35; \tag{6}$$

wherein $f_1$ and $f_2$ have the same meaning as in condition (1), $f_{11}$ is focal length of component $L_{11}$, that is, the most object side positive lens component of the first converging group, $f_{22}$ is focal length of component $L_{22}$ the image side negative lens component of the diverging group, and D is air space between the two negative lens components $L_{21}$ and $L_{22}$ in the diverging group.

The above conditions (4) and (5) define the refractive power allotment among the lens components constituting the respective groups under the conditions of refractive power allotment among the groups previously defined.

When the lowest limit of the condition (4) is exceeded, the refractive power of the object side positive lens component in the first converging group becomes too strong and thereby not only spherical aberration but also astigmatism are unduly strengthened in the negative direction. In addition, as for the spherical aberration it becomes difficult to correct it in the first converging group independently of the other groups. As for the astigmatism it becomes difficult to suppress the change thereof in the position for close-up photography although the correction thereof by the diverging group may be possible in the position for infinity photography.

On the contrary, when the value of condition (4) becomes larger, the change in aberration on the image side positive lens component of the first converging group is increased accordingly. Therefore, the spherical aberration is strengthened in the negative direction. This aberration can be corrected to some extent by the negative lens component in the first converging group.

When the upper limit is exceeded however, the correction becomes impossible.

As for the condition (5) given for the refractive power allotment among the components in the diverging group, a value less than the lowest limit will result in a refractive power of the negative lens component at the image side which is too strong. Then, the rays of an oblique light beam incident upon the marginal position of the component will be abruptly refracted so that coma will become exceedingly asymmetric. When the upper limit is exceeded, the refractive power of the cemented lens component of the diverging group at the object side will become relatively strong, and thereby the achromatic effect in the cemented component will be reduced. Thus, it is difficult to make the diverging group with only two components.

Condition (6) defines the air space between the two negative components in the diverging group. By selecting a relative large value, a well balanced condition of coma and astigmatism can be assured. The lowest limit of the formula may be considered as a sum of the center thickness of one negative component and that of the other in the diverging group. If the air space is reduced to a value less than the lowest limit of the condition, then astigmatism is unduly strengthed in the positive direction. Even though it may be corrected by another component to some extent, it is difficult to suppress the variation thereof in the position for close-up photography. Also, asymmetry of coma is enhanced so that it becomes difficult to obtain a good image in photography with the diaphragm fully open. On the other hand, with the increase of the air space, there occurs the corresponding increase of asymmetry of coma as well as of the distance between the principal planes in the diverging group which necessarily leads to an enlargement of size in length of the total lens system. For these reasons, it is desired to keep the air space within the range defined by the condition.

According to a still further preferred form of the invention, the telephoto lens arranged in the above described manner also is designed to satisfy the following conditions:

$$-1.3 < \frac{r_1 + r_2}{r_1 - r_2} < 0.0; \text{ and} \quad (7)$$

$$-4.0 < \frac{r_3 + r_a}{r_3 - r_a} < 0.0 \quad (8)$$

wherein $r_1$ is the radius of curvature of the object side surface of the positive lens component $L_{11}$ arranged at the object side in the first converging group, $r_2$ is the radius of curvature of the image side surface of the same component $L_{11}$, $r_3$ is the radius of curvature of the object side surface of the positive lens component $L_{12}$ arranged at the image side in the same group, and $r_a$ is the radius of curvature of the most image side surface of the same group.

When these conditions are satisfied, a more easy correction of aberrations is allowed, and more particularly, it becomes possible to limit to a smaller magnitude the variation of aberrations which occur when changing over the photography position from that for infinity to that for close-up and vice versa. When the lowest limits shown in the above conditions (7) and (8) are exceeded, astigmatism and spherical aberration cannot be adequately corrected. If the upper limits are exceeded, then over-correction will result. In either case, there is large variation of aberration upon close-up photography.

In connection with the foregoing conditions, it is further preferred that the image side positive lens component $L_{12}$ and the negative lens component $L_{13}$ in the first converging group be designed to satisfy the following condition:

$$-1.2 < \frac{f_1}{r_5} \leq \frac{f_1}{r_4} < 0.0 \quad (9)$$

wherein, $r_4$ is the radius of curvature of the image side surface of the component $L_{12}$, and $r_5$ is the radius of curvature of the object side surface of the component $L_{13}$.

The achromatic effect derived from both components can be improved when the above condition is satisfied. The use of a value less than the lowest limit will produce a lens which is apt to suffer a change due to color of coma. With an increase in the value it becomes more and more difficult to correct the chromatic aberration of magnification employing glass available at present, and when the upper limit is exceeded, the achromatic effect becomes lost.

Similarly, the diverging lens group is preferably designed to satisfy the following conditions:

$$0.7 < \frac{|r_b|}{|f_2|} < 2.3; \text{ and} \quad (10)$$

$$-0.5 < \frac{r_c + r_d}{r_c - r_d} < 1.0 \quad (11)$$

wherein, $r_b$ is radius of curvature of the cemented surface of the cemented negative lens component $L_{21}$, $r_c$ is the radius of curvature of the object side surface of the single negative lens component $L_{22}$, and $r_d$ is the radius of curvature of the image side surface of the same component.

Condition (10) defines the range in which a better achromatism is assured for the diverging group. With a value less than the lowest limit there often develops a higher order of spherical aberration, and with a value above the upper limit it becomes difficult to correct the aberration employing presently available glass.

Condition (11) defines a desirable configuration for the single negative lens component $L_{22}$. When a value less than the lowest limit is used, the coma is strengthened in the negative direction, and when the upper limit is exceeded, it is strengthened in the positive direction. Therefore, the above condition is desired to keep the symmetry of coma.

Also, as for the second converging lens group is is preferred that the following condition be satisfied to maintain a better chromatic aberration in the group:

$$0.3 < \frac{r_e}{f_3} < 2.0 \quad (12)$$

wherein $r_e$ represents the absolute value for each radius of curvature of the two cemented surfaces.

Under condition (12), a higher order spherical aberration relating to light of short wave length can be easily corrected which is peculiar to large relative aperture lenses. With a value less than the lowermost limit, the achromatic effect is strengthened, but its adverse effect upon other aberrations becomes too large. When the upper limit is exceeded, sufficient correction is no longer possible.

Figure 2:
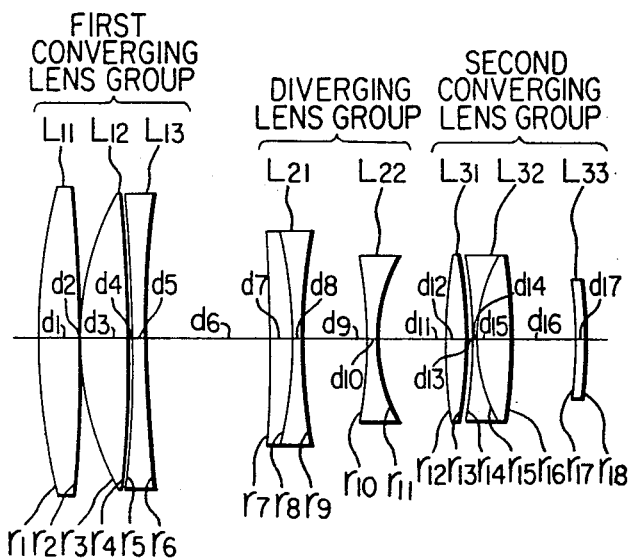

According to a further preferred embodiment of the invention, the performance of the described telephoto lens with large relative aperture is improved by employing a telephoto type arrangement for the second converging lens group, examples of which are shown in FIGS. 2 and 3 and concerning which a detailed description will be made later. Generally, the second converging group is composed of a converging front group and a diverging rear group so as to further reduce the Petzval sum and also to attain a better coincidence of meridional image plane and sagittal image plane. According to this embodiment of the invention, it is possible to further reduce the size or length of the total lens system. For the converging front group, there is used a cemented positive lens component comprising three lenses like the previously described second converging group. As the diverging rear group there is used a single negative lens component. Preferably, any one of the two cemented surfaces of the positive lens component in the converging front group is spaced from the other surface thereof by an air distance. By doing so, the freedom of aberration correction can be increased so as to enable maintaining well balanced aberrations.

The advantages of the embodiment shown in and described in connection with FIG. 1 is demonstrated by the aberration curves of FIGS. 4A, 4B and 4C. These aberrations are found in the position for infinity photography and in the position for close-up photography with magnification $B=-0.1$. In this first illustrated and described embodiment, the magnification of $-0.1$ is obtained by shifting the diverging group toward the image side by 17 mm measured from the position for infinity photography. It is clearly apparent from FIG. 4 that the arrangement of FIG. 1 assures a very good condition of aberrations for a large relative aperture telephoto lens with a focal length of 200 mm and an F number of 2.0 and that even in the position of photography magnification $\beta=-0.1$, the aberrations are sufficiently good at F number 2.0.

Various elements used in the first embodiment are shown in the following table in which $r_1$, $r_2$, $r_3$ ... are the radii of curvature of the refracting surfaces of the respective lenses numbered from the object side, $d_1$, $d_2$, $d_3$ ... are the center thicknesses and air spaces of the respective lenses, $n_1$, $n_2$ ... the refractive indices of the lens materials thereof and $v_1$, $v_2$ ... are the Abbe numbers thereof. The numeral data are as follows:

First Embodiment:
Focal Length f 200.0mm F number 2.0

|  |  | $r_1$ | 207.5 | $d_1$ | 14.0 | $n_1$ | 1.50032 | $v_1$ | 81.9 |
|---|---|---|---|---|---|---|---|---|---|
| $f_1$ | 180.0 | $r_2$ | −491.363 | $d_2$ | 0.3 | | | | |
|  |  | $r_3$ | 112.869 | $d_3$ | 15.5 | $n_2$ | 1.50032 | $v_2$ | 81.9 |
|  |  | $r_4$ | −610.0 | $d_4$ | 0.65 | | | | |
|  |  | $r_5$ | −483.0 | $d_5$ | 5.0 | $n_3$ | 1.75520 | $v_3$ | 27.5 |
|  |  | $r_6$ | 432.252 | $d_6$ | 40.673-57.673 | | | | |
| $f_2$ | −90.0 | $r_7$ | −393.0 | $d_7$ | 7.5 | $n_4$ | 1.79504 | $v_4$ | 28.4 |
|  |  | $r_8$ | −125.0 | $d_8$ | 2.6 | $n_5$ | 1.46450 | $v_5$ | 65.8 |
|  |  | $r_9$ | 330.0 | $d_9$ | 21.5 | | | | |
|  |  | $r_{10}$ | −161.181 | $d_{10}$ | 3.4 | $n_6$ | 1.46450 | $v_6$ | 65.8 |
|  |  | $r_{11}$ | 64.939 | $d_{11}$ | 22.201-5.201 | | | | |
| $f_3$ | 100.0 | $r_{12}$ | 138.5 | $d_{12}$ | 7.0 | $n_7$ | 1.69680 | $v_7$ | 55.6 |
|  |  | $r_{13}$ | −184.0 | $d_{13}$ | 2.0 | $n_8$ | 1.69895 | $v_8$ | 30.0 |
|  |  | $r_{14}$ | 184.0 | $d_{14}$ | 7.0 | $n_9$ | 1.69680 | $v_9$ | 55.6 |
|  |  | $r_{15}$ | −132.984 | | | | | | |

In the second embodiment shown in FIG. 2, the second converging group is structured to improve the Petzval sum as described above. The first converging group and the diverging group are the same as in the first embodiment. The second converging group in the second embodiment differs from such group in the first embodiment in that a single negative lens component $L_{33}$ is added, and the positive lens component $L_3$ of FIG. 1 comprising three lenses cemented together is divided into two separate parts; that is, a single positive lens $L_{31}$ and a lens component $L_{32}$ comprising two lenses cemented together. The further improvement of aberrations attained by the embodiment of FIG. 2 is demonstrated by the aberration charts shown in FIGS. 5A, 5B and 5C.

The third embodiment shown in FIG. 3 is essentially the same as the second embodiment of FIG. 2 with the exception of the structure of the first converging lens group. In the third embodiment, the negative lens component in the first converging lens group is divided into a negative lens $L_{131}$ and a positive lens $L_{132}$ in order to allot the achromatic effect to each. According to the third embodiment, it becomes possible to enlarge the radii of curvature of the refracting surfaces $r_4$ and $r_5$ for achromatism. Also, a further improvement of change in color of coma and of higher order chromatic aberration is possible. FIGS. 6A, 6B and 6C are those found in the position for infinity photography and in the position for short distance photography with $\beta=-0.1$. In either case, the magnification of $-0.1$ is obtained by shifting the diverging lens group toward the image side by 17 mm measured from the position for infinity photography. It will be evident from FIGS. 5A, 5B, 5C, 6A, 6B and 6C that compared with the conventional lens with a focal length of 200 mm, the lenses of FIGS. 2 and 3 which have a large relative aperture of 2.0 suffer only a very reduced variation of aberrations.

Numerical data for the embodiments in FIGS. 2 and 3 are as follows:

Second Embodiment:
Focal Length f 200.0mm F number 2.0

|  |  | $r_1$ | 200.0 | $d_1$ | 14.0 | $n_1$ | 1.50032 | $v_1$ | 81.9 |
|---|---|---|---|---|---|---|---|---|---|
| $f_1$ | 180.0 | $r_2$ | −540.0 | $d_2$ | 0.3 | | | | |
|  |  | $r_3$ | 112.869 | $d_3$ | 15.5 | $n_2$ | 1.50032 | $v_2$ | 81.9 |
|  |  | $r_4$ | −600.0 | $d_4$ | 0.65 | | | | |
|  |  | $r_5$ | −480.0 | $d_5$ | 5.0 | $n_3$ | 1.75520 | $v_3$ | 27.5 |
|  |  | $r_6$ | 431.735 | $d_6$ | 41.201-58.201 | | | | |
| $f_2$ | −90.0 | $r_7$ | −386.0 | $d_7$ | 7.5 | $n_4$ | 1.79504 | $v_4$ | 28.4 |
|  |  | $r_8$ | −125.0 | $d_8$ | 2.6 | $n_5$ | 1.46450 | $v_5$ | 65.8 |
|  |  | $r_9$ | 286.185 | $d_9$ | 21.5 | | | | |
|  |  | $r_{10}$ | −161.181 | $d_{10}$ | 3.4 | $n_6$ | 1.46450 | $v_6$ | 65.8 |
|  |  | $r_{11}$ | 67.815 | $d_{11}$ | 22.912-5.912 | | | | |
| $f_3$ | 100.0 | $r_{12}$ | 171.0 | $d_{12}$ | 6.5 | $n_7$ | 1.69350 | $v_7$ | 53.6 |
|  |  | $r_{13}$ | −131.975 | $d_{13}$ | 2.0 | | | | |
|  |  | $r_{14}$ | −213.0 | $d_{14}$ | 2.0 | $n_8$ | 1.59507 | $v_8$ | 35.6 |
|  |  | $r_{15}$ | 61.0 | $d_{15}$ | 11.0 | $n_9$ | 1.69680 | $v_9$ | 55.6 |
|  |  | $r_{16}$ | −193.237 | $d_{16}$ | 22.0 | | | | |
|  |  | $r_{17}$ | −130.0 | $d_{17}$ | 3.0 | $n_{10}$ | 1.46450 | $v_{10}$ | 65.8 |
|  |  | $r_{18}$ | −311.705 | | | | | | |

Third Embodiment:
Focal Length f 200.0mm F number 2.0

|  |  | $r_1$ | 380.0 | $d_1$ | 10.5 | $n_1$ | 1.62041 | $v_1$ | 60.3 |
|---|---|---|---|---|---|---|---|---|---|
|  |  | $r_2$ | −638.0 | $d_2$ | 0.3 | | | | |
|  |  | $r_3$ | 115.0 | $d_3$ | 15.5 | $n_2$ | 1.50032 | $v_2$ | 81.9 |
|  |  | $r_4$ | −939.0 | $d_4$ | 1.8 | | | | |
| $f_1$ | 180.0 | $r_5$ | −498.693 | $d_5$ | 5.0 | $n_3$ | 1.75692 | $v_3$ | 31.7 |
|  |  | $r_6$ | 230.784 | $d_6$ | 1.0 | | | | |
|  |  | $r_7$ | 175.0 | $d_7$ | 11.0 | $n_4$ | 1.50032 | $v_4$ | 81.9 |
|  |  | $r_8$ | 5631.099 | $d_8$ | 36.739 53.739 | | | | |
|  |  | $r_9$ | −384.0 | $d_9$ | 7.5 | $n_5$ | 1.79504 | $v_5$ | 28.4 |

-continued

Third Embodiment:
Focal Length  f 200.0mm  F number 2.0

$f_2$ −90.0
| | | | | | | |
|---|---|---|---|---|---|---|
| $r_{10}$ −127.0 | $d_{10}$ 2.6 | $n_6$ 1.46450 | $v_6$ 65.8 |
| $r_{11}$ 269.0 | $d_{11}$ 21.4 | | |
| $r_{12}$ −164.945 | $d_{12}$ 3.4 | $n_7$ 1.46450 | $v_7$ 65.8 |
| $r_{13}$ 69.014 | $d_{13}$ 21.791 4.791 | | |

$f_3$ 100.0
| | | | | | | |
|---|---|---|---|---|---|---|
| $r_{14}$ 170.0 | $d_{14}$ 6.5 | $n_8$ 1.69350 | $v_8$ 53.6 |
| $r_{15}$ −131.7 | $d_{15}$ 2.0 | | |
| $r_{16}$ −205.621 | $d_{16}$ 2.0 | $n_9$ 1.59507 | $v_9$ 35.6 |
| $r_{17}$ 64.2 | $d_{17}$ 11.0 | $n_{10}$ 1.69680 | $v_{10}$ 55.6 |
| $r_{18}$ −194.1 | $d_{18}$ 22.0 | | |
| $r_{19}$ −127.991 | $d_{19}$ 3.0 | $n_{11}$ 1.46450 | $v_{11}$ 65.8 |
| $r_{20}$ −258.054 | | | |

As will be apparent from the foregoing description, the telephoto lens of the invention has a larger relative aperture than a conventional telephoto lens. The degradation of aberrations which occur in the position for close-up photography is very slight so that the minimum distance for photography is quite small. When the telephoto lens of the invention is used in a 35 mm single lens reflex camera, an automatic diaphragm mechanism can be incorporated into it in a simple and easy manner and good operation is assured. As a result, the lens of the invention opens a new field of photography. While several preferred embodiments of the invention have been described, it will be apparent that various changes and modifications may be made without departing from the spirit and scope of the invention as sought to be defined in the claims.

We claim:

1. A telephoto lens with a large relative aperture comprising a first converging lens group, a diverging lens group and a second converging lens group in this order as viewed from the object side, the first converging lens group comprising two positive lens components and a negative lens component with an air space therebetween, and remaining fixed when focusing, the diverging lens group comprising a cemented negative lens component and a negative lens component with an air space therebetween larger than the sum of the center thicknesses of these components, the second converging lens group comprising a cemented positive lens component, and remaining fixed when focusing, and the first converging lens group and the diverging lens group together forming substantially an afocal system for an object at infinity, and the diverging lens group being movable along the optical axis toward the image side for focusing on an object at a short distance and toward the object side for focusing on an object at a longer distance.

2. A telephoto lens as set forth in claim 1, wherein said cemented positive lens component in the second converging lens group comprises a positive lens, a negative lens and a positive lens cemented together.

3. A telephoto lens as set forth in claim 2, wherein the following conditions are satisfied:

$$0.8 < \frac{f_1}{f} < 1.0;$$

$$0.3 < \frac{|f_2|}{f} < 0.6;$$

$$1.0 < \frac{f_{11}}{f_1} < 3.3;$$

$$0.8 < \frac{|f_{22}|}{|f_2|} < 1.5; \text{ and}$$

$$0.15 < \frac{D}{|f_2|} < 0.35;$$

wherein
f is the composite focal length of the total system;
$f_1$ is the focal length of the first converging lens group;
$f_2$ is the focal length of the diverging lens group;
$f_{11}$ is the focal length of the object side positive lens component in the first converging lens group;
$f_{22}$ is the focal length of the image side negative lens component in the diverging lens group; and
D is the air space between the two negative lens components in the diverging lens group.

4. A telephoto lens as set forth in claim 3, wherein the following conditions are satisfied:

$$-1.3 < \frac{r_1 + r_2}{r_1 - r_2} < 0.0;$$

$$-4.0 < \frac{r_3 + r_a}{r_3 - r_a} < 0.0;$$

$$-1.2 < \frac{f_1}{r_5} \leq \frac{f_1}{r_4} < 0.0;$$

$$0.7 < \frac{|r_b|}{|f_2|} < 2.3;$$

$$-0.5 < \frac{r_c + r_d}{r_c - r_d} < 1.0; \text{ and}$$

$$0.3 < \frac{r_e}{f_3} < 2.0;$$

wherein
$r_1$ is the radius of curvature of the object side surface of the positive lens component disposed at the object side in the first converging lens group;
$r_2$ is the radius of curvature of the image side surface of the same component;
$r_3$ is the radius of curvature of the object side surface of the positive lens component disposed at the image side in the first converging lens group;
$r_4$ is the radius of curvature of the image side surface of the same component;
$r_5$ is the radius of curvature of the object side surface of the negative lens component in the first converging lens group;
$r_a$ is the radius of curvature of the most image side surface of the same lens group;
$r_b$ is the radius of curvature of the cemented surface of the cemented negative lens component in the diverging lens group;
$r_c$ is the radius of curvature of the object side surface of the negative lens component disposed at the image side in the diverging lens group;
$r_d$ is the radius of curvature of the image side surface of the same component;
$r_e$ is the absolute value of the radius of curvature of the cemented surface of the cemented positive lens component in the second converging lens group;
$f_1$ is the composite focal length of the total system;
$f_2$ is the focal length of the diverging lens group; and
$f_3$ is the focal length of the second converging lens group.

5. A telephoto lens as set forth in claim 4, wherein the numerical data are:

Focal Length  f 200.0mm  F Number 2.0

| | | | | | | |
|---|---|---|---|---|---|---|
| $r_1$ 207.5 | $d_1$ 14.0 | $n_1$ 1.50032 | $v_1$ 81.9 |

-continued

| Focal Length | f 200.0mm | F Number 2.0 | | | | | | |
|---|---|---|---|---|---|---|---|---|
| | $r_2$ | −491.363 | $d_2$ | 0.3 | | | | |
| | $r_3$ | 112.869 | $d_3$ | 15.5 | $n_2$ | 1.50032 | $v_2$ | 81.9 |
| $f_1$ 180.0 | $r_4$ | −610.0 | $d_4$ | 0.65 | | | | |
| | $r_5$ | −483.0 | $d_5$ | 5.0 | $n_3$ | 1.75520 | $v_3$ | 27.5 |
| | $r_6$ | 432.252 | $d_6$ | 40.673-57.673 | | | | |
| | $r_7$ | −393.0 | $d_7$ | 7.5 | $n_4$ | 1.79504 | $v_4$ | 28.4 |
| | $r_8$ | −125.0 | $d_8$ | 2.6 | $n_5$ | 1.46450 | $v_5$ | 65.8 |
| $f_2$ −90.0 | $r_9$ | 330.0 | $d_9$ | 21.5 | | | | |
| | $r_{10}$ | −161.181 | $d_{10}$ | 3.4 | $n_6$ | 1.46450 | $v_6$ | 65.8 |
| | $r_{11}$ | 64.939 | $d_{11}$ | 22.201-5.201 | | | | |
| | $r_{12}$ | 138.5 | $d_{12}$ | 7.0 | $n_7$ | 1.69680 | $v_7$ | 55.6 |
| | $r_{13}$ | −184.0 | $d_{13}$ | 2.0 | $n_8$ | 1.69895 | $v_8$ | 30.0 |
| $f_3$ 100.0 | $r_{14}$ | 184.0 | $d_{14}$ | 7.0 | $n_9$ | 1.69680 | $v_9$ | 55.6 |
| | $r_{15}$ | −132.984 | | | | | | | wherein $r_1, r_2, r_3 \ldots$ are the radii of curvature of the refracting surfaces of the respective lenses;

$d_1, d_2, d_3 \ldots$ are the center thicknesses thereof and air spaces;

$n_1, n_2, n_3 \ldots$ are the indices of refraction of the respective lens materials; and $v_1, v_2, v_3 \ldots$ are the Abbe numbers thereof.

6. A telephoto lens as set forth in claim 1, wherein the second converging lens group comprises a negative lens and a positive lens cemented together and said second converging lens group further comprises a positive lens component disposed at the object side and a negative lens component at the image side.

7. A telephoto lens as set forth in claim 6, wherein the following conditions are satisfied:

$$0.8 < \frac{f_1}{f} < 1.0;$$

$$0.3 < \frac{|f_2|}{f} < 0.6;$$

$$1.0 < \frac{f_{11}}{f_1} < 3.3;$$

$$0.8 < \frac{|f_{22}|}{|f_2|} < 1.5; \text{ and}$$

$$0.15 < \frac{D}{|f_2|} < 0.35;$$

wherein f is the composite focal length of the total system;

$f_1$ is the focal length of the first converging lens group;

$f_2$ is the focal length of the diverging lens group;

$f_{11}$ is the focal length of the object side positive lens component in the first converging lens group;

$f_{22}$ is the focal length of the image side negative lens component in the diverging lens group; and D is the air space between the two negative lens components in the diverging lens group.

8. A telephoto lens as set forth in claim 7, wherein the following conditions are satisfied:

$$-1.3 < \frac{r_1 + r_2}{r_1 - r_2} < 0.0;$$

$$-4.0 < \frac{r_3 + r_a}{r_3 - r_a} < 0.0;$$

$$-1.2 < \frac{f_1}{r_5} \leq \frac{f_1}{r_4} < 0.0;$$

$$0.7 < \frac{|r_b|}{|f_2|} < 2.3;$$

$$-0.5 < \frac{r_c + r_d}{r_c - r_d} < 1.0; \text{ and}$$

$$0.3 < \frac{r_e}{f_3} < 2.0;$$

wherein $r_1$ is the radius of curvature of the object side surface of the positive lens component disposed at the object side in the first converging lens group;

$r_2$ is the radius of curvature of the image side surface of the same component;

$r_3$ is the radius of curvature of the object side surface of the positive lens component disposed at the image side in the first converging lens group;

$r_4$ is the radius of curvature of the image side surface of the same component;

$r_5$ is the radius of curvature of the object side surface of the negative lens component in the first converging lens group;

$r_a$ is the radius of curvature of the most image side surface of the same lens group;

$r_b$ is the radius of curvature of the cemented surface of the cemented negative lens component in the diverging lens group;

$r_c$ is the radius of curvature of the object side surface of the negative lens component disposed at the image side in the diverging lens group;

$r_d$ is the radius of curvature of the image side surface of the same component;

$r_e$ is the absolute value of the radius of curvature of the cemented surface of the cemented positive lens component in the second converging lens group;

$f_1$ is the composite focal length of the total system;

$f_2$ is the focal length of the diverging lens group; and $f_3$ is the focal length of the second converging lens group.

9. A telephoto lens as set forth in claim 8, wherein the numerical data are:

| Focal Length | f 200.0mm | F number 2.0 | | | | | | |
|---|---|---|---|---|---|---|---|---|
| | $r_1$ | 200.0 | $d_1$ | 14.0 | $n_1$ | 1.50032 | $v_1$ | 81.9 |
| | $r_2$ | −540.0 | $d_2$ | 0.3 | | | | |
| | $r_3$ | 112.869 | $d_3$ | 15.5 | $n_2$ | 1.50032 | $v_2$ | 81.9 |
| $f_1$ 180.0 | $r_4$ | −600.0 | $d_4$ | 0.65 | | | | |
| | $r_5$ | −480.0 | $d_5$ | 5.0 | $n_3$ | 1.75520 | $v_3$ | 27.5 |
| | $r_6$ | 431.735 | $d_6$ | 41.201-58.201 | | | | |
| | $r_7$ | −386.0 | $d_7$ | 7.5 | $n_4$ | 1.79504 | $v_4$ | 28.4 |
| | $r_8$ | −125.0 | $d_8$ | 2.6 | $n_5$ | 1.46450 | $v_5$ | 65.8 |
| $f_2$ −90.0 | $r_9$ | 286.185 | $d_9$ | 21.5 | | | | |
| | $r_{10}$ | −161.181 | $d_{10}$ | 3.4 | $n_6$ | 1.46450 | $v_6$ | 65.8 |
| | $r_{11}$ | 67.815 | $d_{11}$ | 22.912-5.912 | | | | |
| | $r_{12}$ | 171.0 | $d_{12}$ | 6.5 | $n_7$ | 1.69350 | $v_7$ | 53.6 |
| | $r_{13}$ | −131.975 | $d_{13}$ | 2.0 | | | | |
| | $r_{14}$ | −213.0 | $d_{14}$ | 2.0 | $n_8$ | 1.59507 | $v_8$ | 35.6 |
| $f_3$ 100.0 | $r_{15}$ | 61.0 | $d_{15}$ | 11.0 | $n_9$ | 1.69680 | $v_9$ | 55.6 |
| | $r_{16}$ | −193.237 | $d_{16}$ | 22.0 | | | | |
| | $r_{17}$ | −130.0 | $d_{17}$ | 3.0 | $n_{10}$ | 1.46450 | $v_{10}$ | 65.8 |
| | $r_{18}$ | −311.705 | | | | | | | wherein $r_1, r_2, r_3 \ldots$ are the radii of curvature of the refracting surfaces of the respective lenses;

$d_1, d_2, d_3 \ldots$ are the center thicknesses thereof and air spaces;

$n_1, n_2, n_3 \ldots$ are the indices of refraction of the respective lens materials; and $v_1, v_2, v_3 \ldots$ are the Abbe numbers thereof.

10. A telephoto lens as set forth in claim 8, wherein said first converging lens group further comprises a positive lens component disposed at the image side of said negative lens component.

11. A telephoto lens as set forth in claim 10, wherein the numerical data are:

| Focal Length | f 200.0mm | | F number 2.0 | | | | |
|---|---|---|---|---|---|---|---|
| | $r_1$ | 380.0 | $d_1$ | 10.5 | $n_1$ 1.62041 | $v_1$ | 60.3 |
| | $r_2$ | −638.0 | $d_2$ | 0.3 | | | |
| | $r_3$ | 115.0 | $d_3$ | 15.5 | $n_2$ 1.50032 | $v_2$ | 81.9 |
| | $r_4$ | −939.0 | $d_4$ | 1.8 | | | |
| $f_1$ 180.0 | $r_5$ | −498.693 | $d_5$ | 5.0 | $n_3$ 1.75692 | $v_3$ | 31.7 |
| | $r_6$ | 230.784 | $d_6$ | 1.0 | | | |
| | $r_7$ | 175.0 | $d_7$ | 11.0 | $n_4$ 1.50032 | $v_4$ | 81.9 |
| | $r_8$ | 5631.099 | $d_8$ | 36.739 53.739 | | | |
| | $r_9$ | −384.0 | $d_9$ | 7.5 | $n_5$ 1.79504 | $v_5$ | 28.4 |
| | $r_{10}$ | −127.0 | $d_{10}$ | 2.6 | $n_6$ 1.46450 | $v_6$ | 65.8 |
| $f_2$ −90.0 | $r_{11}$ | 269.0 | $d_{11}$ | 21.4 | | | |
| | $r_{12}$ | −164.945 | $d_{12}$ | 3.4 | $n_7$ 1.46450 | $v_7$ | 65.8 |

-continued

| Focal Length | f 200.0mm | | F number 2.0 | | | | |
|---|---|---|---|---|---|---|---|
| | $r_{13}$ | 60.014 | $d_{13}$ | 21.791 4.791 | | | |
| | $r_{14}$ | 170.0 | $d_{14}$ | 6.5 | $n_8$ 1.69350 | $v_8$ | 53.6 |
| | $r_{15}$ | −131.7 | $d_{15}$ | 2.0 | | | |
| | $r_{16}$ | −205.621 | $d_{16}$ | 2.0 | $n_9$ 1.59507 | $v_9$ | 35.6 |
| $f_3$ 100.0 | $r_{17}$ | 64.2 | $d_{17}$ | 11.0 | $n_{10}$ 1.69680 | $v_{10}$ | 55.6 |
| | $r_{18}$ | −194.1 | $d_{18}$ | 22.0 | | | |
| | $r_{19}$ | −127.991 | $d_{19}$ | 3.0 | $n_{11}$ 1.46450 | $v_{11}$ | 65.8 |
| | $r_{20}$ | −258.054 | | | | | | wherein $r_1, r_2, r_3$ ... are the radii of curvature of the refracting surfaces of the respective lenses;

$d_1, d_2, d_3$ ... are the center thicknesses and air spaces thereof;

$n_1, n_2, n_3$ ... are the indices of refraction of the respective lens materials; and $v_1, v_2, v_3$ ... are the Abbe numbers thereof.

* * * * *